US011302978B2

(12) United States Patent
Endres et al.

(10) Patent No.: US 11,302,978 B2
(45) Date of Patent: Apr. 12, 2022

(54) BATTERY HOUSING, BATTERY ARRANGEMENT AND METHOD FOR PRODUCING A BATTERY HOUSING

(71) Applicant: AIRBUS DEFENCE AND SPACE GMBH, Taufkirchen (DE)

(72) Inventors: Gregor Christian Endres, Pfaffenhofen (DE); Markus J. Weber, Hamburg (DE)

(73) Assignee: Airbus Defence and Space GmbH, Taufkirchen (DE)

(*) Notice: Subject to any disclaimer, the term of this patent is extended or adjusted under 35 U.S.C. 154(b) by 109 days.

(21) Appl. No.: 16/155,596

(22) Filed: Oct. 9, 2018

(65) Prior Publication Data
US 2019/0123316 A1 Apr. 25, 2019

(30) Foreign Application Priority Data
Oct. 13, 2017 (DE) ...................... 10 2017 218 310.1

(51) Int. Cl.
| H01M 2/10 | (2006.01) |
| B64D 27/02 | (2006.01) |
| B64G 1/42 | (2006.01) |
| H01M 50/20 | (2021.01) |
| B60L 50/64 | (2019.01) |
| H01M 10/6551 | (2014.01) |
| H01M 10/625 | (2014.01) |
| H01M 10/60 | (2014.01) |
| H01M 10/6556 | (2014.01) |
| H01M 50/24 | (2021.01) |
| H01M 10/643 | (2014.01) |

(52) U.S. Cl.
CPC ............ *H01M 50/20* (2021.01); *B60L 50/64* (2019.02); *B64D 27/02* (2013.01); *B64G 1/425* (2013.01); *H01M 10/60* (2015.04); *H01M 10/625* (2015.04); *H01M 10/6551* (2015.04); *H01M 10/6556* (2015.04); *H01M 50/24* (2021.01); *B60L 2200/10* (2013.01); *H01M 10/643* (2015.04); *H01M 2220/20* (2013.01)

(58) Field of Classification Search
CPC .... H01M 2/022; H01M 2/105; H01M 2/1094; H01M 2/0267; H01M 2/0292; H01M 10/60; H01M 10/61; H01M 10/613; H01M 10/617; H01M 10/6556; H01M 10/6557; H01M 10/6566; H01M 10/6568; H01M 50/20; H01M 50/24; H01M 10/6551; H01M 10/625; H01M 10/643; H01M 10/653; H01M 2220/20; B60L 50/64; B60L 2200/10; B64D 27/02; B64D 27/26; B64G 1/425
See application file for complete search history.

(56) References Cited

U.S. PATENT DOCUMENTS

| 8,356,451 | B2 | 1/2013 | Weber et al. | |
| 8,967,529 | B1 | 3/2015 | Bennett | |
| 9,289,927 | B2 | 3/2016 | Weber et al. | |
| 2004/0137321 | A1* | 7/2004 | Savaria | H01M 2/1016 429/176 |
| 2004/0211862 | A1* | 10/2004 | Elam | A63H 27/02 244/58 |
| 2005/0164080 | A1* | 7/2005 | Kozu | H01M 2/105 429/176 |
| 2006/0063067 | A1* | 3/2006 | Kim | H01M 2/021 429/148 |
| 2009/0252917 | A1* | 10/2009 | Weber | B29C 44/56 428/102 |
| 2011/0294000 | A1* | 12/2011 | Kim | H01M 2/1077 429/176 |
| 2012/0103714 | A1* | 5/2012 | Choi | B60K 1/04 180/68.5 |
| 2015/0303531 | A1 | 10/2015 | Willgert et al. | |
| 2016/0380247 | A1* | 12/2016 | Juzkow | H01M 2/1077 429/99 |

FOREIGN PATENT DOCUMENTS

| DE | 10 2005 024 408 A1 | 11/2006 |
| DE | 10 2007 063 269 A1 | 6/2009 |
| DE | 10 2009 026 458 A1 | 12/2010 |
| DE | 10 2011 005 403 A1 | 6/2012 |
| DE | 10 2012 209 349 A1 | 5/2013 |
| EP | 2 008 354 A2 | 12/2008 |
| EP | 2 416 402 A1 | 2/2012 |
| WO | WO 2007/095327 A2 | 8/2007 |

OTHER PUBLICATIONS

German Office Action for German Application No. 10 2017 218 310.1 dated Jul. 26, 2018.
Extended European Search Report for Application No. 18199121.7 dated Feb. 22, 2019.

* cited by examiner

Primary Examiner — Matthew W Van Oudenaren
(74) Attorney, Agent, or Firm — Jenkins, Wilson, Taylor & Hunt, P.A.

(57) ABSTRACT

A battery housing for the structural integration of batteries in a vehicle, in particular an aircraft or spacecraft, includes an inner housing for receiving a battery, and an outer housing which surrounds the inner housing such that a cavity is formed between the inner housing and the outer housing, wherein pins are formed in the cavity and connect the inner housing to the outer housing. A battery arrangement includes at least one battery housing of this type and at least one battery which is arranged in the inner housing of the at least one battery housing.

14 Claims, 3 Drawing Sheets ent of damage. The inner housing can advantageously be designed
BATTERY HOUSING, BATTERY ARRANGEMENT AND METHOD FOR PRODUCING A BATTERY HOUSING

CROSS-REFERENCE TO RELATED APPLICATION

This application claims priority to German Patent Application DE 10 2017 218 310.1 filed Oct. 13, 2017, the entire disclosure of which is incorporated by reference herein.

TECHNICAL FIELD

The present disclosure relates to a battery housing for the structural integration of a battery in a vehicle, in particular an aircraft or spacecraft, to a battery arrangement with a battery housing of this type and to a method for producing such a battery housing.

BACKGROUND

Although usable in diverse applications, the present disclosure and the problem on which the disclosure herein is based will be explained in more detail with respect to passenger aircraft. However, the described methods and devices can also be used in different vehicles and in all sectors of the transport industry, for example for road vehicles, for rail vehicles, for aircraft or for watercraft.

Lithium-ion batteries can be encountered as rechargeable energy accumulators in the most diverse sectors of the art. In particular, they serve in electro mobility as energy accumulators for electric cars and hybrid vehicles. For this purpose, many manufacturers implement a multiplicity of batteries in the form of what are referred to as battery packs in the region of the floor of a vehicle body, see, for example, the documents DE 10 2011 005 403 A1 and EP 2 008 354 A2. It may be entirely necessary in this case to connect several thousand individual cells to one another, e.g. lithium-ion round cells having a cylinder diameter of approximately 20 mm and a length of approximately 100 mm. However, the generic integration concepts pursued in this case are not always suitable for meeting the technical requirements and boundary conditions for aircraft in a structural respect.

The document DE 10 2005 024 408 A1 describes a method for reinforcing foam materials during the production of fiber-reinforced plastics components, the method also being referred to as the "tied-foam-core" technique. In the method, a foam material is provided with fiber bundles which are introduced into the foam material with a needle. In this case, a through hole is first of all pricked into the foam material from one side with the needle in order then to be able to pick up a fiber bundle located on the other side with the needle and pull same into the foam material. The through hole with the fiber bundle located therein is subsequently infiltrated with a matrix material, e.g. a synthetic resin, and cured such that, as a result, the foam material is pierced with rigid pins and reinforced. For a sandwich structure, this infiltration step can be carried out when cover layers have already been applied, wherein the cover layers and the reinforced core material can be cured together.

SUMMARY

Against this background, the present disclosure is based on the object of finding solutions for cost-effectively and simultaneously securely integrating a large number of batteries in a vehicle.

According to the disclosure herein, this object is achieved by a battery housing, a battery arrangement, and a method with features disclosed herein.

According thereto, a battery housing for the structural integration of batteries in a vehicle, in particular an aircraft or spacecraft, is provided. The battery housing comprises an inner housing for receiving a battery, and an outer housing which surrounds the inner housing in such a manner that a cavity is formed between the inner housing and the outer housing, wherein a multiplicity or plurality of pins are formed in the cavity and connect the inner housing to the outer housing.

Furthermore, a battery arrangement comprising at least one battery housing according to the disclosure herein is provided. The battery arrangement furthermore comprises at least one battery which is arranged in the inner housing of the at least one battery housing.

Furthermore, an aircraft or space craft comprising a battery arrangement according to the disclosure herein is provided.

A method for producing at least one battery housing for the structural integration of batteries in a vehicle, in particular an aircraft or spacecraft, is furthermore provided. The method comprises forming, in particular two, housing half shells from a foam material, wherein each housing half shell is formed on at least one inner side with at least one receiving depression; covering the inner side and an outer side opposite the inner side with a respective cover layer; connecting the cover layer of the outer side to the cover layer of the inner side at least in the region of the at least one receiving depression via pins and/or fiber bundles; joining together the housing half shells on the inner sides, which are provided with a cover layer, to form a housing shell, wherein the receiving depressions of the housing half shells in each case in pairs form an inner housing for receiving a battery, and the outer sides of the housing shells in each case form an outer housing surrounding the inner housing; infiltrating the housing shell with a matrix material; and curing the housing shell to form at least one battery housing.

A concept on which the present disclosure is based consists in or comprises in each case encapsulating a battery in a dedicated housing, wherein an inner housing is surrounded by a cavity which can be used for different purposes and which is also pierced by structure-reinforcing pins which structurally anchor the inner housing in an outer housing. The pins can advantageously be designed, arranged and oriented here in different embodiments, depending on which requirements the specific application poses to a person skilled in the art. The cavity can be used, for example, in order to regulate the operating temperature of the enclosed battery, for example by an airflow or in general a fluid flow being conducted through the cavity. In a departure from fluids for regulating temperature, a suitable extinguishing agent or fire-retardant fluid can also be introduced in the event of damage. Furthermore, a cavity of this type can serve as an outlet channel in order to conduct away gases or liquids which possibly occur in the event of damage. The inner housing can advantageously be designed in such a manner that thermal expansion of the battery is made possible in order to meet any operating conditions. In this case, the pins can connect the inner housing to the outer housing in a flexible manner such that the inner housing is movable to a certain extent inside the outer housing.

Such an encapsulation of a battery affords advantages in particular in the aerospace sector where, because of the high power requirements, ten thousand or more individual batteries or individual cells have to be installed, depending on the vehicle, in order, for example, to supply an electric drive with energy. It may be necessary in this connection to heat or to cool the batteries in order to set as efficient a working point as possible. Furthermore, the optimum working point can greatly vary during use of the vehicle (e.g. during take off, landing, taxiing and/or flight mode, etc.), wherein general operating temperatures of the vehicle may quite possibly fluctuate between −55° degrees and 75° degrees or more, but at least batteries nowadays should optimally operate approximately at room temperature. Added to this is the fact that, during operation, each battery generates thermal energy of the order of magnitude of several watts which should likewise be conducted away. As a result, it may be required, depending on use, for each individual battery to be individually connected and controlled or regulated and able to be replaced when required. The present disclosure now precisely permits this, with it being assured in particular in the event of damage, because of the physical separation that adjacent batteries are not affected, e.g. by the gases which possibly occur under high pressure and high temperature. The dimensioning of the cavity, or the outer dimensions of the battery housing, can be correspondingly advantageously selected in order, for example, to permit a desired volumetric flow of a fluid through the cavity.

A battery within the context of the disclosure herein is a general, rechargeable electric accumulator element. It may be a secondary cell, i.e. an individual accumulator element in the sense of a secondary element, a battery cell, a rechargeable cell or the like. However, batteries according to the disclosure herein in principle also comprise interconnected secondary cells and/or interconnected accumulator elements, i.e. a battery consisting of secondary cells. Batteries within the context of the disclosure herein in particular comprise lithium-ion batteries. The present disclosure is primarily concerned with the structural mounting or holding of batteries. The specific electrical circuitry and connection of the batteries can be carried out in any manner familiar to a person skilled in the art.

A further concept on which the disclosure herein is based involves the use of method steps which are particularly suitable for the cost-efficient mass production of fiber composite components, wherein the latter in turn have particular advantages especially in the air travel sector. During the production, the battery housing is defined here in the interior by a foam material which, inter alia, serves as a shaping tool during the production. By the foam material as support material, pins and/or fiber bundles (which are cured later by resin infiltration to form pins) can be introduced via the advantageous "tied-foam-core" technique in an automated method for reinforcing the housing and for connecting the inner housing and the outer housing. This technique is particularly efficient in terms of time and costs and is therefore especially suitable for the mass manufacturing of identical modules. Individual battery housings can then be readily connected in diverse arrangements and orientations to form rows, panels and/or packs of battery housings, with it being possible for several thousand individual batteries to be combined. Such an arrangement can advantageously also be undertaken prior to the infiltration with a resin system, or prior to the curing, in order to achieve an overall integral structure. In addition, the housing half shells used during the production can be used for different purposes. For example, cavities can be defined in order to conduct cooling and/or heating fluids or the like through the housing. The cavity between the inner housing and the outer housing can be configured as a safety barrier for emergency situations or malfunctions.

According to one development, a separating layer can be provided. The separating layer can be formed in the cavity. The separating layer can connect the inner housing to the outer housing in such a manner that the cavity is divided by the separating layer into two separate regions. The separating layer can be used for different purposes and applications.

For example, the separating layer can divide the cavity into two regions which are separated in a fluid-tight manner. The two separate regions can be used for the conducting through of fluids in different directions, e.g. cooling fluids, heating fluids, extinguishing fluids, etc. In one example, one region can be used as an outlet channel for toxic substances which may leak out of the battery in the event of damage. By contrast, the other region can be used for the conducting through of a cooling liquid.

For example, the separating layer can be designed as a stiffening layer of the battery housing. In this advantageous embodiment, the separating layer can therefore be used in order to form the battery housing to be robust in relation to severe accelerations. For example, a plurality of battery housings can be connected to one another in a different orientation, wherein the separating layers serve as stiffening regions. In one example, a panel consisting of battery housings can be provided, with the separating layer being oriented in a normal direction. Within this context, the separating layer can be designed for improving the flexural rigidity, the shearing resistance and/or rigidity to shearing force of the overall assembly.

According to one development, the method can furthermore comprise removing the foam material from the battery housing for forming a cavity between the inner housing and the outer housing. For this purpose, for example, a mechanical and/or chemical treatment of the foam material can be provided, e.g. a sandblasted process and/or a liquid solvent.

According to one development, the cavity can be at least partially filled with a foam material. The foam material can therefore be at least partially let into the cavity, or a foam material can be introduced retrospectively. The foam material can be used, for example, for thermal insulation or for improvement of the fire resistance of the battery housing. For example, the foam material can be provided in one of the separate regions defined by a separating layer while the other region can be determined for the conducting through of a cooling liquid or outgassing.

According to one development, the inner housing and the outer housing can be formed from plastic, in particular fiber-reinforced plastic. The pins can be formed by resin-infiltrated fiber bundles. For example, use can be made of carbon fibers, glass fibers and/or aramid fibers or the like. For example, a synthetic resin or another plastic known to a person skilled in the art can be used as the plastics or matrix material.

According to one development, the inner housing can be designed for receiving the battery in a precisely fitting manner. Within this context, any movement of the battery within the battery housing is suppressed. This is relevant especially in the case of aircraft since vibrations can occur here over a broad spectrum of frequencies and amplitudes and the batteries should furthermore be protected as well as possible in the event of impacts or strikes. However, it is alternatively also possible for a certain clearance to be left between the battery and the inner housing. In this case, the movement of the battery can be restricted via additional measures. For example, the manner of this measure may also facilitate a subsequent exchange of individual battery cells.

According to one development, the inner housing can be of cylindrical design for receiving a cylindrical battery. The battery housing according to the disclosure herein can thus be designed, for example, for receiving known and possibly standardized lithium-ion batteries.

According to one development of the battery arrangement, the at least one battery can be fastened in the inner housing.

According to one development of the battery arrangement, the at least one battery can be connected in an integrally bonded manner to the inner housing. For example, the battery can be fitted in the inner housing with a thermally conductive adhesive. For example, it is possible to select an adhesive which is dissolvable by action of radiation or the like such that the battery is exchangeable in the event of damage. Alternatively or additionally, the at least one battery can be fastened in a mechanically releasable manner to the inner housing, e.g. with a mechanical holder and/or via a plug-in, click and/or snap-action mechanism.

According to one development of the battery arrangement, the inner housing together with the battery can define an intermediate space which can be filled with a low-viscosity liquid. The low-viscosity liquid makes it not only possible to limit or to virtually completely suppress the movement of the battery within the inner housing. Furthermore, the low-viscosity liquid can be used for thermal conduction, i.e. more effectively cooling and/or heating up the battery.

According to one development of the battery arrangement, a plurality of battery housings and a plurality of batteries can be provided. It is firstly possible to connect individual battery housings to one another after their individual production, for example by adhesive bonding or other joining methods. Secondly, a battery arrangement comprising a plurality of battery housings can already be manufactured directly as an (integral) multiple module.

The cavities of the individual battery housings of the battery arrangement can be separated off from one another in a fluid-tight manner in this development. This affords the advantage that the batteries can be operated in a manner decoupled from one another in the individual battery housings. For example, the cavity can be used in each case for conducting away and/or conducting in fluids without any effect on the adjacent batteries occurring.

According to one development, the battery arrangement can be designed as a sandwich panel, cladding panel and/or floor panel and/or the like. Within this context, the battery arrangement according to the disclosure herein can be designed in particular as a multifunctional sandwich panel having structurally integrated batteries, which can be used, for example, as a floor panel and can furthermore be provided with thermal-insulation and/or air-conditioning properties.

According to one development of the method, the housing half shells can be formed with a plurality of receiving depressions such that a plurality of battery housings are produced simultaneously.

According to one development of the method, a shape-maintaining tool can be temporarily introduced into the receiving depressions of the two housing half shells in order to set a desired shape of the inner housing during the curing. For example, the receiving depressions can be at least temporarily filled with a metal cylinder which, during the following method steps, ensures the desired shape for the inner housing.

The above refinements and developments can be combined with one another as desired, if expedient. Further possible refinements, developments and implementations of the disclosure herein also comprise combinations, which are not explicitly mentioned, of features of the disclosure herein described previously or below with respect to the exemplary embodiments. In particular, a person skilled in the art will also add individual aspects as improvements or additions to the respective basic form of the present disclosure.

BRIEF DESCRIPTION OF THE DRAWINGS

The disclosure herein will be explained in more detail below with reference to the exemplary embodiments indicated in the schematic figures, in which.

Figure 1:
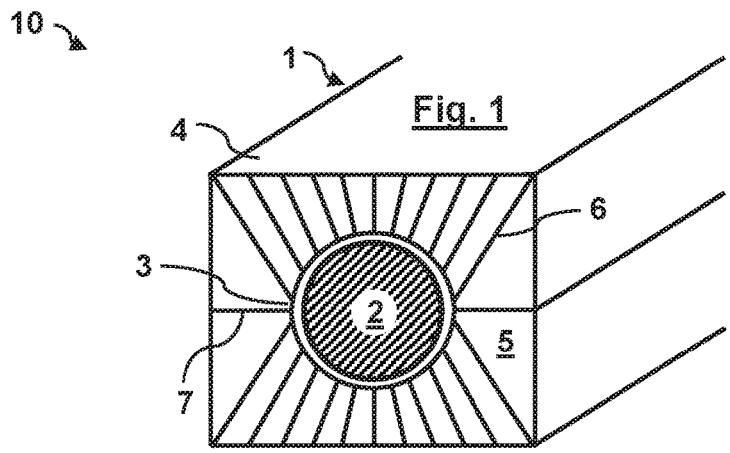
FIG. 1 shows a schematic perspective sectional view of a battery arrangement comprising a battery housing according to one embodiment of the disclosure herein.

The attached figures are intended to provide further understanding of the embodiments of the disclosure herein. They illustrate embodiments and serve in conjunction with the description for explaining principles and concepts of the disclosure herein. Other embodiments and many of the advantages mentioned arise with respect to the drawings. The elements of the drawings are not necessarily shown true to scale with respect to one another.

In the figures of the drawing, identical, functionally identical and identically acting elements, features and components are each provided with the same reference signs unless stated otherwise.

DETAILED DESCRIPTION

FIG. 1 shows a schematic perspective sectional view of a battery arrangement 10 comprising a battery housing 1 according to one embodiment of the disclosure herein.

Figure 6:
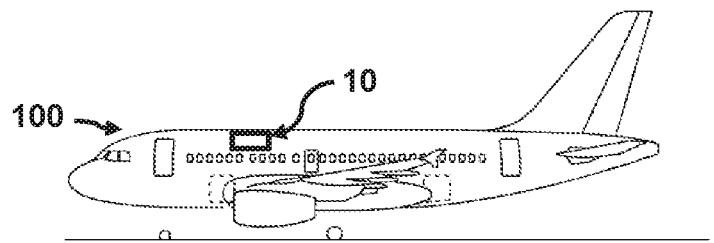
FIG. 6 shows a schematic side view of an aircraft comprising the battery arrangement from FIGS. 1-3.

The battery housing 1 serves for the structural integration of a battery 2 in a vehicle, in particular an aircraft 100 (e.g. a passenger aircraft), as can be seen schematically in FIG. 6. The battery housing 1 comprises an inner housing 3, in which a battery 2 is arranged, and an outer housing 4. A cavity 5 is formed between the inner housing 3 and the outer housing 4 and is pierced with pins 6 which connect the inner housing 3 to the outer housing 4. Furthermore, a separating layer 7 is formed in the cavity 5 of the battery housing 1 and likewise connects the inner housing 3 to the outer housing 4. In the specific exemplary embodiment shown, the cavity 5 is divided by the separating layer 7 into two separate regions.

The arrangement shown of the pins 5 should be understood as being purely by way of example here. In principle, the pins can be formed, arranged and oriented in different embodiments. In the present case, the pins 5 only connect the inner housing 3 to an upper and a lower side of the outer housing 4, i.e. to opposite sides. Similarly, the pins, for example, can connect all sides of the outer housing 4 to the inner housing 3. The battery housing 1 is designed in such a manner that thermal expansion of the battery 2 is permitted in order to meet various operating conditions of the passenger aircraft 100. For this purpose, the pins 6 are of correspondingly flexible design such that the inner housing 3 is (slightly) movable within the outer housing 4. In principle, the inner housing 3 can alternatively or additionally be composed of a suitable material which permits corresponding expansion of the inner housing 3 under the effect of heat. Alternatively or additionally, the pins 6 can be formed, for example, from a suitable material having a corresponding coefficient of thermal expansion such that the pins are deformable in the event of a change in temperature. The inner housing 3 and the outer housing 4 are composed of a fiber-reinforced plastic. The pins 6 are formed from resin-infiltrated fiber bundles.

The inner housing 3 is of cylindrical design for receiving a cylindrical battery 2. The battery 2 can be, for example, a known type of a lithium-ion secondary battery which is in the form of a round cell and is frequently used, for example, in the electric car sector. The battery 2 can in principle be fastened in the inner housing 3 of the battery housing 1, e.g. via a thermally conductive adhesive or via a mechanical holder. The inner housing 3 can be designed for receiving the battery 2 in a precisely fitting manner. Alternatively, as shown in FIG. 1, an intermediate space can also remain between the battery 2 and the inner housing 3. The intermediate space can be filled, for example, with a low-viscosity and thermally sufficiently conductive liquid in order to achieve suitable insulation in relation to mechanically excited vibrations, impacts and/or strikes.

For the integration of electric drives in a typical passenger aircraft 100, as is shown in FIG. 6, several thousand individual batteries or battery cells or rechargeable cells are required. The structural installation for the holder of the batteries has to meet the corresponding safety regulations. In addition, the installation of a very large number of individual batteries is intended to be possible cost-effectively and rapidly. The embodiment shown of a battery housing now meets both of these stipulations. The production method of such a or similar housing will be explained in more detail further below with respect to FIGS. 4a-4d. The structural properties of a battery housing 1 of this type will be set out below briefly.

On account of the double housing according to the disclosure herein, each battery 2 is isolated from the adjacent batteries. Firstly, a structurally stable integration of the battery into the outer housing 4 or the battery arrangement 10 is achieved via the pins 6. Secondly, the pins 6 in conjunction with the inner housing 3 and a corresponding fastening of the battery 2 to the inner housing 3 permit a certain flexibility in relation to temperature-induced changes in the expansion of the materials. Under typical use conditions of passenger aircraft 100, the operating temperature may fluctuate between −55° degrees and 75° degrees. In order to ensure optimum operation of the batteries 2, the latter can be correspondingly cooled and/or heated. For this purpose, in the present embodiment, because of the encapsulation each individual battery can also be individually connected and controlled or regulated. Adjacent batteries will not be directly influenced in the event of failure or damage of a battery 2. The dimensioning of the cavity 5 can be correspondingly advantageously selected in order, for example, to permit a desirable volumetric flow of a fluid, e.g. a gas or a liquid, through the cavity 5. The cavity 5 can be used, for example, in order to regulate the operating temperature of the enclosed battery 2, for example by a fluid flow being conducted through the cavity 5. Furthermore, the cavity 5 can serve as an outlet channel in order to conduct away gases or liquids which possibly occur in the event of damage. Furthermore, the separating layer 7 can also be formed in an advantageous manner. The separating layer 7 can thus divide the cavity 5 into two regions which are separated in a fluid-tight manner. Alternatively or additionally, the separating layer 7 can act as a stiffening layer of the battery housing 1. This is intended to be clarified with respect to FIGS. 2 and 3.

Figure 2:
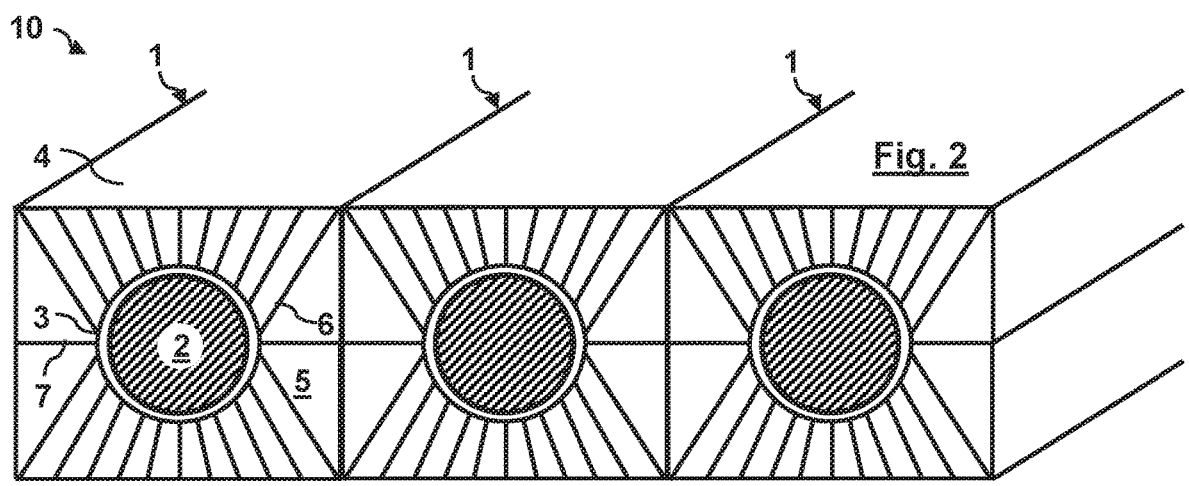
FIG. 2 shows a schematic perspective sectional view of a battery arrangement comprising a plurality of battery housings from FIG. 1 according to a further embodiment of the disclosure herein.
Figure 3:
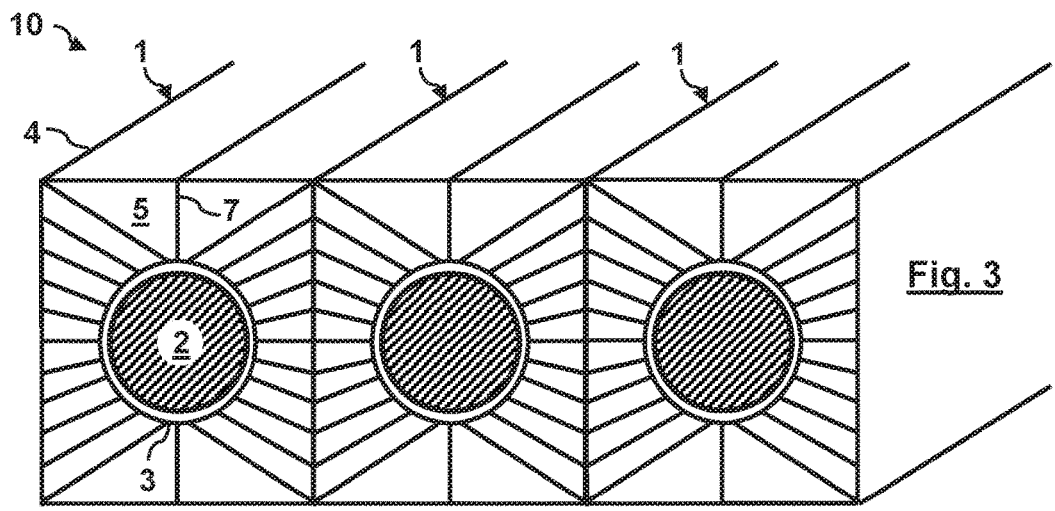
FIG. 3 shows a schematic perspective sectional view of a battery arrangement comprising a plurality of battery housings from FIG. 1 according to an alternative embodiment of the disclosure herein.
Figure 4A:
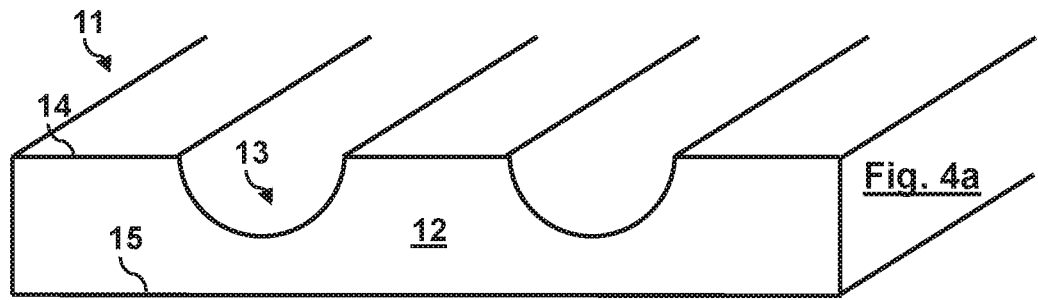
FIG. 4a-4d show schematic perspective sectional views of a battery housing at different times during the production with a method according to an embodiment of the disclosure herein.
Figure 4B:
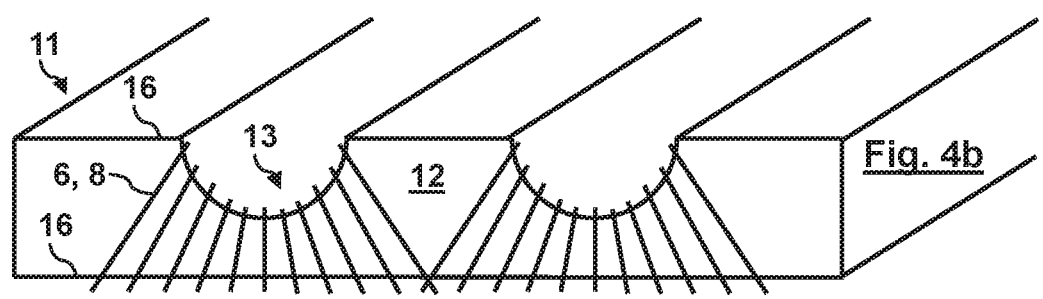
Figure 4C:
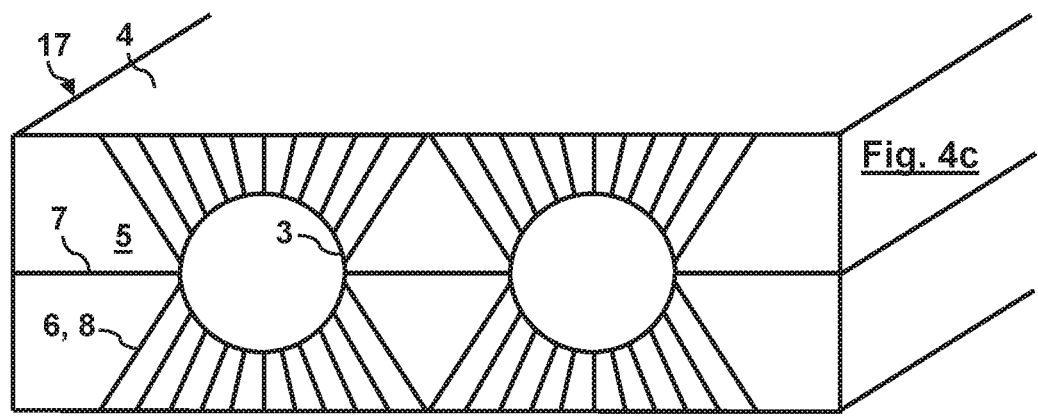
Figure 4D:
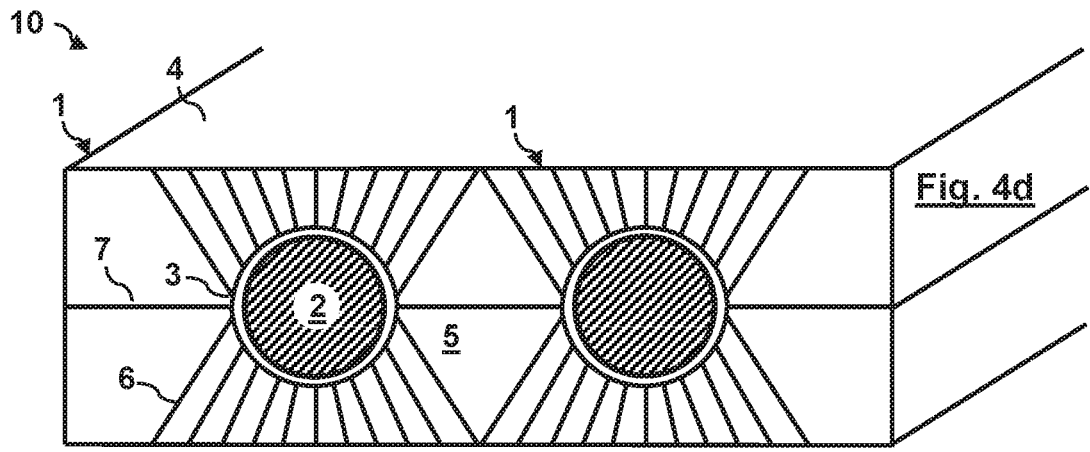

FIG. 2 shows a schematic perspective sectional view of a battery arrangement 10 comprising a plurality of battery housings 1 which each correspond to the battery housing 1 from FIG. 1. FIG. 3 likewise shows a schematic perspective sectional view of a battery arrangement 10 comprising a plurality of battery housings 1, wherein the individual battery housings 1 are oriented differently than in FIG. 2. The battery housings 1 can be produced together or separately, wherein, in the latter case, for example, they may have been attached to one another retrospectively.

In the embodiment according to FIG. 2, the separating layer 7 is in each case arranged horizontally and separates the cavities 5 of the battery housings 1 into an upper and a lower region in each case. The cavities 5 of the individual battery housings 1 can be separated off from one another here in a fluid-tight manner. Furthermore, the upper and lower regions can also be separated from one another in each case in a fluid-tight manner. For example, each cavity 5 can be divided into two separate fluid channels, through which a fluid, e.g. a cooling or heating liquid, flows in an opposite direction. Each battery housing 1 can therefore be regulated separately from the others. The battery arrangement 10 can be designed, for example, as a sandwich panel, e.g. as a floor panel or the like, with structurally integrated batteries 2. For this purpose, the cavity 5 can be at least partially filled with a foam material, depending on the application, in order, for example, to achieve desired insulating properties or the like for the sandwich panel. The battery arrangement 10 can therefore form a load-bearing structure of the aircraft 100 or can constitute part of a load-bearing structure.

In the embodiment according to FIG. 3, the separating layer 7 is, by contrast, oriented perpendicularly to the horizontal. In this embodiment, the separating layer 7 serves as a stiffening layer of the battery housing 1 or of the battery arrangement 10. In principle, it is therefore possible to form complex arrangements of a plurality of individual battery housings 1, for example rows of battery housings 1 according to FIGS. 2 and 3 can be arranged above one another, behind one another and/or next to one another. Alternatively or additionally, it is possible, for example, to arrange a plurality of battery housings 1 in one plane, wherein the batteries 2 are in each case oriented along a normal direction of the plane (i.e. in this case the image plane of FIG. 2 or 3 would constitute the plane of the battery arrangement 10, wherein the batteries 2 project out of the plane, i.e. are oriented perpendicularly to the image plane of FIG. 2 or 3).

Figure 5:
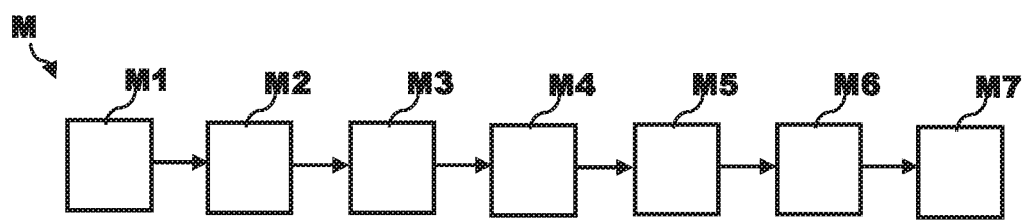
FIG. 5 shows a schematic sequence diagram of the method from FIGS. 4a-d.

FIGS. 4a-4d show schematic perspective sectional views of a battery housing 1 at various times during the production with a method M according to one embodiment of the disclosure herein. FIG. 5 shows a schematic sequence diagram of the method M from FIGS. 4a-4d. A method M of this type can be used, for example, to produce the battery housings 1 of FIGS. 1-3.

The method M comprises, under M1, forming two housing half shells 11 from a foam material 12. In this case, each housing half shell 11 is formed on an inner side 14 with at least one receiving depression 13 (with two in the example shown). The foam material can be any foam material, e.g. a PMI rigid foam material. However, use may also be made of other foam materials which are composed, for example, of polyvinylchloride or polyurethanes. The method M furthermore comprises, under M2, covering the inner side 14 and an outer side 15 opposite the inner side 14 with a respective cover layer 16. Each cover layer 16 can be composed, for example, of a plastics composite and/or can comprise a textile woven fabric or the like. The method M furthermore comprises, under M3, connecting the cover layer 16 of the outer side 15 to the cover layer 16 of the inner side 14 at least in the region of the at least one receiving depression 13 via pins 6 and/or fiber bundles 8. The pins 6 and/or fiber bundles 8 can be applied to the cover layer 16 and firmly adhesively bonded thereto, laminated into same and/or sewn to same, etc. In this case, use can be made, for example, of a "tied-foam-core" technique. Additional layers of fiber material and/or fiber composite material can be placed onto the surfaces in order, for example, to cover protruding ends of the pins 6 and/or fiber bundles 8 such that the pins 6 and/or fiber bundles 8 are finally laminated therein and form an integral connection with the cover layer 16.

Under M4, the method M furthermore comprises joining together the two housing half shells 11 on the inner sides 14, which are provided with a cover layer 16, to form a housing shell 17. The receiving depressions 13 of the two housing half shells 11 in each case here in pairs form an inner housing 3 for receiving a battery 2, and the outer sides 15 of the housing shells 17 in each case form an outer housing 4 surrounding the inner housing 3. The cover layer 16 on the inner sides 14 are placed one above another here and in combination form a separating layer 7. In order to ensure a desired shape of the inner housing 3 during the following method steps, a shape-maintaining tool (not illustrated, e.g. a metal cylinder) can be temporarily introduced into the receiving depressions 13 of the two housing half shells 11. Subsequently, under M5, the housing shell 17, optionally including the pins 6 and/or fiber bundles 8, is infiltrated with a matrix material, e.g. a synthetic resin, and, under M6, cured to form a battery housing 10. Finally, the foam material under M7 is removed from the battery housing 1 in order to form a cavity 5 between the inner housing 3 and the outer housing 4, and batteries 2 are fastened in the inner housings 3.

Purely by way of example, FIGS. 4a-4d show the simultaneous production of two battery housings 1 which each have an inner housing 3, an outer housing 4 and a plurality of pins 6. It goes without saying that, with an appropriately modified method M, any number of battery housings 1 can be manufactured in an identical or different configuration. In particular, the battery housings 1 shown in FIGS. 1-3 can be produced with a corresponding method M. Correspondingly, the individual half shells 11 in FIG. 4a can also obtain receiving depressions 13 on both sides, which permits an overall tighter nesting together of a plurality of battery cells.

In the described method M, the foam material serves as a shaping tool and is removed again in later steps. In principle, the disclosure herein also provides methods in which the foam material at least partially remains in the cavity 5, for example for the purpose of insulation or the like. Depending on use, it is self-evident to a person skilled in the art that further fiber (composite) layers can be provided in the individual method steps in order to achieve certain properties. Furthermore, the battery housings 1 produced in such a manner can be combined and joined together in diverse ways to form rows, layers or panels and/or packs consisting of a plurality of battery housings 1. For this purpose, the components can furthermore also be trimmed. The method M which is described can be used industrially in an automated manner for the time- and cost-efficient mass manufacturing of such battery housings 1 and is thus particularly interesting in particular for the aerospace sector. However, the methods and devices described are, however, also useable in different vehicles and in all sectors of transport industry, for example for road vehicles, for rail vehicles, for aircraft or for watercraft.

In the preceding detailed description, various features for improving the stringency of the illustration have been combined in one or more examples. However, it should be clear here that the above description is merely illustrative, and is not of a restrictive nature in any way. It serves to cover all the alternatives, modifications and equivalents of the various features and exemplary embodiments. Many other examples will be clear immediately and directly to a person skilled in the art on the basis of his/her specialist knowledge in view of the above description.

The exemplary embodiments have been selected and described in order to be able to present the principles underlying the invention and their application possibilities in practice as well as possible. As a result, specialist personnel can modify and use the invention and its various exemplary embodiments in an optimum way with respect to the intended purpose of use. In the claims and the description, the terms "including" and "comprising" are used as neutral terms for the corresponding terms "comprising". Furthermore, use of the terms "a", "an" and "one" is not intended to exclude in principle a plurality of features and components which are described in such a way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Battery housing
2 Battery
3 Inner housing
4 Outer housing
5 Cavity
6 Pin
7 Separating layer
8 Fiber bundle
10 Battery arrangement
11 Housing half shell
12 Foam material
13 Receiving depression
14 Inner side
15 Outer side
16 Cover layer
17 Housing shell 100 Aircraft
M Method
M1 Method step
M2 Method step
M3 Method step
M4 Method step
M5 Method step
M6 Method step

The invention claimed is:

1. A battery housing for structural integration of batteries in a vehicle, the battery housing comprising:
   an inner housing for receiving a battery;
   an outer housing which surrounds the inner housing such that a cavity is formed between the inner housing and the outer housing; and
   a separating layer which is formed in the cavity and connects the inner housing to the outer housing such that the cavity is divided by the separating layer into two separate regions;
   wherein the separating layer divides the cavity into two regions which are separated in a fluid-tight manner;
   wherein a first of the two regions is configured as an outlet for fluids to be expelled from the cavity and a second of the two regions is configured as an inlet for fluids to ingress into the cavity; and
   wherein the inner housing and outer housing are connected together by a plurality of structure-reinforcing pins which are disposed or pierced through the cavity from the outer housing to the inner housing.

2. The battery housing according to claim 1, wherein the separating layer is a stiffening layer of the battery housing.

3. The battery housing according to claim 1, wherein the cavity is at least partially filled with a foam material.

4. The battery housing according to claim 1, wherein the inner housing and the outer housing are formed from plastic and the pins are formed from resin-infiltrated fiber bundles.

5. The battery housing according to claim 1, wherein the inner housing is configured for receiving the battery in a precisely fitting manner.

6. The battery housing according to claim 1, wherein the inner housing is of cylindrical design for receiving a cylindrical battery.

7. A battery arrangement comprising at least one battery housing according to claim 1 and comprising at least one battery which is arranged in the inner housing of the at least one battery housing.

8. The battery arrangement according to claim 7, wherein the at least one battery is fastened in the inner housing.

9. The battery arrangement according to claim 7, wherein the at least one battery is connected in an integrally bonded manner to the inner housing or is fastened in a mechanically releasable manner to the inner housing.

10. The battery arrangement according to claim 7, wherein the inner housing together with the battery defines an intermediate space which is filled with a thermally conductive liquid.

11. The battery arrangement according to claim 7, comprising a plurality of battery housings and a plurality of batteries.

12. The battery arrangement according to claim 11, wherein the cavities of the individual battery housings are separated off from one another in a fluid-tight manner.

13. The battery arrangement according to claim 7, wherein the battery arrangement is configured as a sandwich panel, cladding panel, and/or floor panel.

14. An aircraft or spacecraft comprising a battery arrangement according to claim 10.

* * * * *